(12) United States Patent
Lyons et al.

(10) Patent No.: US 11,947,465 B2
(45) Date of Patent: Apr. 2, 2024

(54) BUFFER OVERFLOW TRAPPING

(71) Applicant: International Business Machines Corporation, Armonk, NY (US)

(72) Inventors: Michael Peter Lyons, Arlington, MA (US); Andrew C. M. Hicks, Wappingers Falls, NY (US); Tynan J. Garrett, Poughkeepsie, NY (US); Miles C. Pedrone, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 530 days.

(21) Appl. No.: 17/068,915

(22) Filed: Oct. 13, 2020

(65) Prior Publication Data

US 2022/0114106 A1 Apr. 14, 2022

(51) Int. Cl.
| | | |
|---|---|---|
| *G06F 21/00* | (2013.01) | |
| *G06F 9/455* | (2018.01) | |
| *G06F 12/1027* | (2016.01) | |
| *G06F 21/52* | (2013.01) | |
| *G06F 21/56* | (2013.01) | |

(52) U.S. Cl.
CPC ...... *G06F 12/1027* (2013.01); *G06F 9/45558* (2013.01); *G06F 21/52* (2013.01); *G06F 21/566* (2013.01); *G06F 2009/45583* (2013.01); *G06F 2212/68* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,157,663 A | 10/1992 | Major et al. | |
| 6,381,694 B1 | 4/2002 | Yen | |
| 6,802,029 B2 | 10/2004 | Shen et al. | |
| 7,647,637 B2 | 1/2010 | Schuba et al. | |
| 8,819,822 B1* | 8/2014 | Pike | G06F 21/562 |
| | | | 726/22 |

(Continued)

OTHER PUBLICATIONS

VMware, "Understanding Memory Resource Management in VMware ESX Server", VMware White Paper, Aug. 20, 2009, p. 1-20. (Year: 2009).*

(Continued)

*Primary Examiner* — Jeffery L Williams
(74) *Attorney, Agent, or Firm* — Cantor Colburn LLP; Teddi Maranzano

(57) ABSTRACT

Aspects of the invention include receiving, at an operating system executing on a processor, a write request from a program to write data to a memory. The write request includes a virtual memory address and the data. It is determined that the virtual memory address is not assigned to a physical memory address. Based on the determining, the unassigned virtual memory address is assigned to a physical memory address in an overflow memory. The data is written to the physical memory address in the overflow memory and an indication that the write data was successfully written is returned to the program. Future requests by the program to access the virtual memory address are directed to the physical memory address in the overflow memory.

17 Claims, 6 Drawing Sheets

(56) References Cited

U.S. PATENT DOCUMENTS

| | | | |
|---|---|---|---|
| 8,893,278 B1* | 11/2014 | Chechik | G06F 21/56 |
| | | | 713/188 |
| 9,804,975 B2 | 10/2017 | Stevens | |
| 9,990,492 B2 | 6/2018 | Melski et al. | |
| 11,030,112 B2* | 6/2021 | Tsirkin | G06F 12/1441 |
| 2002/0144141 A1 | 10/2002 | Edwards et al. | |
| 2005/0114411 A1 | 5/2005 | Childs et al. | |
| 2013/0091318 A1* | 4/2013 | Bhattacharjee | G06F 12/145 |
| | | | 711/6 |
| 2014/0033309 A1* | 1/2014 | Leake | G06F 21/53 |
| | | | 726/23 |
| 2015/0371036 A1 | 12/2015 | Warkentin et al. | |
| 2017/0364452 A1* | 12/2017 | Okhravi | G06F 11/1048 |
| 2019/0132358 A1* | 5/2019 | DiValentin | H04L 63/1416 |
| 2019/0361815 A1* | 11/2019 | Tsirkin | G06F 12/1036 |
| 2020/0236079 A1* | 7/2020 | Shulman | H04L 63/1425 |
| 2021/0110040 A1* | 4/2021 | Boivie | G06F 9/30076 |
| 2021/0160284 A1* | 5/2021 | Strogov | H04L 63/0245 |
| 2021/0319104 A1* | 10/2021 | Jagannathan | G06F 21/567 |
| 2022/0114106 A1* | 4/2022 | Lyons | G06F 12/1027 |
| 2022/0141194 A1* | 5/2022 | Xiao | H04L 63/029 |
| | | | 726/12 |

OTHER PUBLICATIONS

Combined Search and Examination Report for Application No. GB2113827.6 dated May 31, 2022, 9 Pages.

Nomoto et al., "Using a Hypervisor to Migrate Running Operating Systems to Secure Virtual Machines", 34 Annual IEEE Computer Software and Applications Conference (COMPSAC), 2010, IEEE, pp. 37-46.

Sebastian Paakkola, "Assessing performance overhead of Virtual Machine Introspection and its suitability for malware analysis" University of Turku, Jun. 2020, pp. 1-110.

Tanda Satoshi et al., "Detect Kernel-Mode Rootkits via Real Time Logging & Controlling Memory Access", Annual ADFSL Conference on Digital Forensics, Security and Law, May 2017, pp. 1-41.

* cited by examiner

BUFFER OVERFLOW TRAPPING

BACKGROUND

The present invention generally relates to buffer overflow trapping, and more specifically, to a non-backed memory honey pot for buffer overflow trapping.

Memory management is the process of controlling and coordinating computer memory, including assigning portions of memory to various programs that are executing. Memory management functions can reside in computer hardware, in an operating system (OS), and in programs and applications. Buffer overflow refers to an instance in which a program executing on a computer begins to access (either read or write) portions of a memory that are not assigned to the program. The portions of memory not assigned to the program may be assigned to another program executing on the computer. A buffer overflow can be caused for example, by human errors such as programming errors. In other cases, a buffer overflow may be performed purposefully and result in the execution of malicious code.

SUMMARY

Embodiments of the present invention are directed to buffer overflow trapping. A non-limiting example computer-implemented method includes receiving, at an operating system executing on a processor, a write request from a program to write data to a memory. The write request includes a virtual memory address and the data. The method determines that the virtual memory address is not assigned to a physical memory address. Based on the determining, the virtual memory address is assigned to a physical memory address in an overflow memory. The data is written to the physical memory address in the overflow memory and an indication that the write data was successfully written is returned to the program. Future requests by the program to access the virtual memory address are directed to the physical memory address in the overflow memory.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
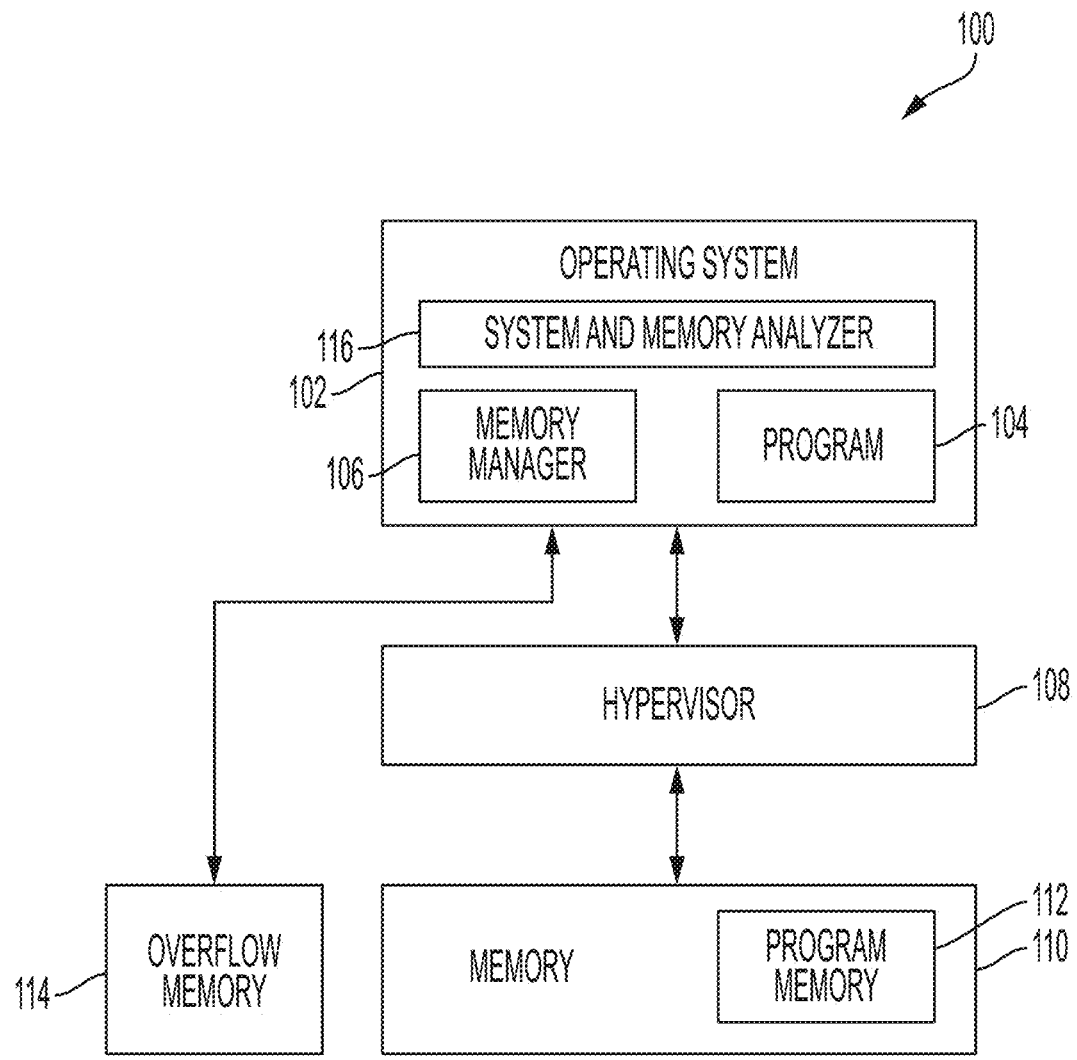
FIG. 1 depicts a block diagram of a system for buffer overflow trapping according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention provide a defense mechanism against buffer overflows by artificially inserting holes into normally contiguous memory assignments. In accordance with one or more embodiments of the present invention, a translation table is used to map virtual memory addresses to physical addresses and strategic holes are placed in the translation table's mapping to force buffer overflows into regions that have a higher probability of being open. An open region in the translation table contains a virtual address that has not been assigned to a physical memory addresses, and therefore is not backed by physical memory. In accordance with one or more embodiments of the present invention, a program stepping over its memory boundary by requesting access, via the translation table, to a non-backed virtual memory address triggers a memory manager of the computer system to take the virtual address requested and to place the data into an area of memory referred to herein as an overflow, or honey pot, memory.

The overflow, or honey pot, memory, can be implemented by a pool of well-known and controlled memory areas within the computer system. In accordance with one or more embodiments of the present invention, the overflow memory area is configured to prevent its contents from being executable by a program. This can be done, for example, by setting an Instruction Execution Protection (IEP) bit to prevent code in a respective storage block of the overflow memory from being executed. While writing to the overflow memory, an intensive recording process can simultaneously gather information about the program and/or data being written. The gathered information can be stored and then analyzed.

As known to those skilled in the art the term "honey pot" refers to a computer security mechanism set to detect, deflect, or in some manner, counteract attempts at unauthorized use of information systems. Generally, a honey pot includes data that appears to be a legitimate part of the site or application but is actually isolated and monitored. The honey pot seems to contain information or a resource of value to attackers, who are then blocked. The terms honey pot memory and overflow memory are used interchangeably herein to refer to a portion of a memory that is utilized by one or more embodiments of the present invention when a program attempts to access a memory location that is not assigned to the program.

When computer programs utilize different regions of the same physical memory it is important to keep the computer programs running within their assigned memory regions.

Software programs at higher levels (e.g., source code level) have checks that generally keep all of the execution of the programs and the data in organized locations that are within their assigned memory regions. However, at the microcode (or assembly) level, these built-in checks are often not available. This can happen for a variety of reasons, but chief among them are efficiency and/or performance considerations. The system trusts that the information given to the microcode or assembly instructions is valid and thus, these operations often do not check for data integrity. This allows these operations to execute as quickly as possible.

In many of these lower level operations, systems utilize a memory manager to broker requests between a given program's virtual memory and the physical, or real, memory wherein the data is stored. As described above, in contemporary systems the memory manager typically performs memory access requests without checking for repercussions, trusting that the checks performed by the software layers above it ensure proper execution. Because the memory manager is not checking for buffer overflows, a given program may access areas of virtual or physical memory that it shouldn't be able to access. A buffer overflow can be caused by human error or it can be done purposely for malicious reasons. Often a buffer overflow is due to a miscalculated address or memory offset amount, resulting in a request to a memory location outside of the requesting program's memory region as defined by whatever arbitrating function (e.g., a hypervisor) the program is running under. When a buffer overflow occurs, a given program can overwrite or process data used by another running program, which can cause a multitude of errors, crashes, collisions, etc. which may result in bringing the system down.

One or more embodiments of the present invention provide technological improvements over current methods of providing access to memory that may result in buffer overflows. A disadvantage of contemporary approaches is that a program may gain access to a memory region assigned to another program and thus cause errors in the execution of the other program, for example, by overwriting memory locations used by the other program. This can be caused, for example, by a poor code structure or by poor handling of data sizes resulting in the ability to write to sections of memory just outside the bounds of a code library. In addition, accessing a memory region assigned to another program can cause errors in the program accessing the memory for example, by causing the program to read and act upon presumably invalid data from the other program. Another disadvantage of contemporary approaches is that when a program requests access to a virtual memory address that is not backed by a physical memory, the program is notified of the error. In the case of a malicious attack, the attacker is notified that virtual address is not valid and the attacker can attempt to access other virtual addresses until a memory backed address is located.

One or more embodiments of the present invention provide technical solutions to one or more of these disadvantages by creating a translation table with strategically placed gaps where virtual addresses do not map to physical addresses (i.e., non-backed virtual memory addresses). When a program attempts to access one of the non-backed memory addresses, the memory manager directs the access to an overflow memory (e.g., by associating the virtual memory address in the request to a physical address in the overflow memory) and allows the program to perform the access in the overflow memory. The redirection to the overflow area is transparent to the requesting program so that a potential hacker or threat actor is not aware that the program is accessing a memory location in the overflow area. The redirection of the memory access prevents the program from accessing data outside of its assigned memory area which can result in a reduction in system errors. In addition, in response to detecting an access to the overflow memory, one or more embodiments of the present invention gather state information about the program and/or data being written that can be used to identify and analyze the program. In the case where the program is a malicious program, this information can be used to provide awareness of the offending program and/or to prevent the program or programs employing similar tactics from being executed in the future.

Turning now to FIG. 1, a block diagram of a system 100 for buffer overflow trapping is generally shown in accordance with one or more embodiments of the present invention. The system includes an operating system (OS) 102, a hypervisor 108, a memory 110, and an overflow memory 114. As shown in FIG. 1, the OS 102 includes a memory manager 106, a program 104 being executed by the OS 102, and a system and memory analyzer 116. In the embodiment shown in FIG. 1, the memory manager 106 provides an interface between the program 104 and the hypervisor 108 to request accesses to the memory 110. In addition, the memory manager 106 provides an interface to redirect memory access requests from the program 104 to the overflow memory 114 when needed to avoid buffer overflows. The system and memory analyzer 116 shown in FIG. 1 collects state information about the program requesting access to a non-backed memory address and/or about the data being written that can be used to identify and analyze the program.

In accordance with one or more embodiments of the present invention, the memory manager 106 receives a virtual memory address from the program 104 and translates it into a physical memory address located either in the program memory 112 or in the overflow memory 114. The memory manager 106 may include a translation lookaside buffer (TLB) as known in the art to perform this translation. A simple check can be employed in order to identify when the program 104 is attempting to access a memory location outside of its original allotted space. A valid virtual memory address has physical memory assigned to it and if a program, or process, requests data from a non-backed memory location, the memory manager 106 immediately knows that the address is erroneous and will not perform the request. The ability of the memory manager 106 to detect these buffer overflows is utilized by one or more embodiments of the present invention as a mechanism for identifying possible malicious programs.

In accordance with one or more embodiments of the present invention, the overflow memory 114 is located in a different physical memory device (or memory module or memory system) than the memory 110 that includes the program memory 112. In accordance with one or more other embodiments of the present invention, the overflow memory 114 and the memory 110 are located in different regions of the same memory device (or memory module or memory system).

In accordance with one or more embodiments of the present invention, the program 104 sends a write request that includes a virtual memory address and data, to the memory manager 106. The memory manager 106 forwards the request to the hypervisor 108 which instructs the memory 110 to write the data to the memory location in the memory 110 at the physical memory address that is associated with the virtual memory address. If the virtual memory address is a non-backed virtual memory address, the memory 110 returns an error indicating the non-backed state to the hypervisor 108 which relays the error indication to the OS 102. The hypervisor 108 can then allocate, or assign, an area in the honey pot, or overflow memory 114, for buffer overflows of the program 104 and notify the memory manager 106 of the allocation. The memory manager 106 can store the correspondence between the virtual memory address in the write request from the program 104 and the physical memory address in the overflow memory 114 in a TLB, or in another location. The hypervisor 108 writes the data to the location in the overflow memory 114. The overflow memory 114 indicates to the hypervisor 108 that the write is successful, and the hypervisor 108 communicates the successful write status to the program 104 and the program 104 continues executing. The next time that the program requests an access to a non-backed virtual memory address, the memory manager 106 directs the access to the overflow memory 114 assigned to the program 104. The memory translation error is hidden from the program 104 altogether. The memory manager 106 flags the request and sends back an address that is for an area in the overflow memory 114 and forwards all subsequent requests in that range (e.g., at that virtual memory address) there. The memory manager 106 can additionally flag requests for additional pages requested by the program 104 and send them to this area in the overflow memory 114. In accordance with one or more embodiments of the present invention, the size of the overflow memory 114 is sufficiently large and if it gets close to being completely filled, contents of the overflow memory 114 are written out to a disk that is configured such that all the information can be captured.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, programs, functional blocks, connections between functional blocks, modules, inputs, outputs, etc.). For example, the system and memory analyzer 116 may be included in the memory manager 106. In another example, the system and memory analyzer 116 may be executing on a different processor under a different OS 102 than the memory manager 106. Further, the embodiments described herein with respect to device 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
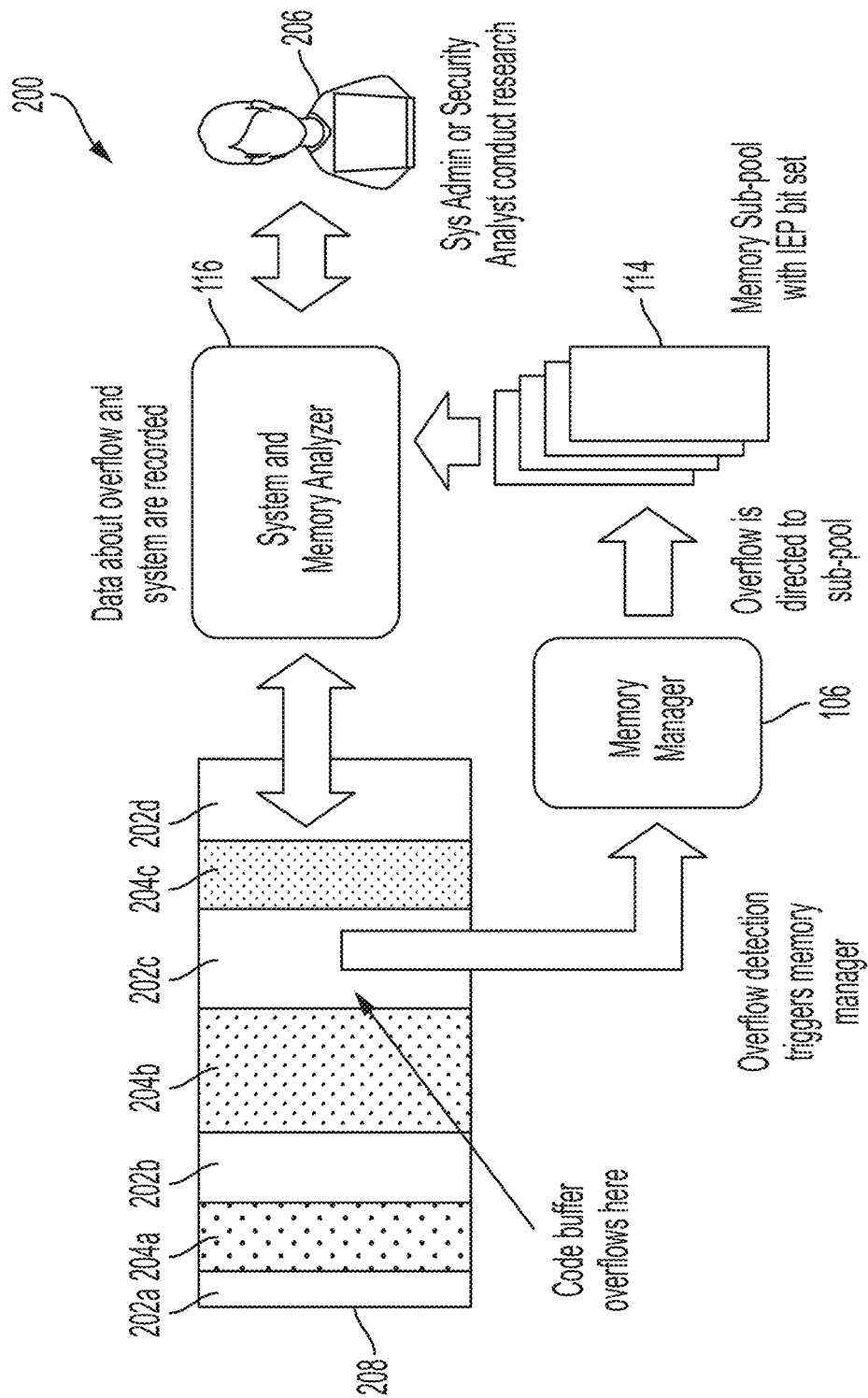
FIG. 2 depicts a block diagram of components of buffer overflow trapping according to one or more embodiments of the present invention.

Turning now to FIG. 2, a block diagram 200 of components for buffer overflow trapping is generally shown in accordance with one or more embodiments of the present invention. The block diagram 200 of FIG. 2 illustrates a high level flow of interactions between a TLB 208, system and memory analyzer 116, memory manager 106, overflow memory 114, and a person 206 (e.g., a systems analyst or security analyst).

The block diagram 200 of FIG. 2 includes a TLB 208 for use in translating virtual memory addresses into physical memory addresses. The TLB 208 shown in FIG. 2 includes memory backed virtual memory addresses 204a 204b 204c, referred to collectively herein as memory backed virtual memory addresses 204, which correspond to physical memory addresses. The TLB 208 also includes non-backed virtual memory addresses 202a 202b 202c 202d, referred to collectively herein as non-backed virtual memory addresses 202, which have not been assigned to physical memory addresses. The placement of non-backed virtual memory addresses 202 between memory backed virtual memory addresses 204 is an example of artificially putting holes into normally contiguous memory assignments (e.g., a sparse memory placement).

The TLB 208 shown in FIG. 2 includes strategically placed holes in the TLB's mapping in order to force offending buffer overflows into regions that have a higher probability of being open. This arrangement where holes are placed in the TLB s mapping is referred to herein as configuring the TLB using "sparse memory placement." In accordance with one or more embodiments of the present invention, memory backed virtual memory addresses 204a includes all of the virtual memory addresses assigned to "program a", memory backed virtual memory addresses 204b includes all of the virtual memory addresses assigned to "program b", and memory backed virtual addresses 204c includes all of the virtual memory addresses assigned to "program c." As shown in the TLB 208 of FIG. 2, the memory allocation has been done strategically to allow for large regions of space between virtual addresses assigned to programs, making it harder for one program to overlap with another program's memory.

Embodiments of the TLB 208 are not limited to keeping all virtual addresses for a program in contiguous entries as the memory assigned to a program may be broken up into multiple segments. One of more embodiments of the present invention can offset common memory segments (e.g. 512 megabyte (MB) or 2048 MB pages) and place non-backed memory segments at the beginning and end of each segment at known offsets. For example, if the page ends at memory address 0x000A, a hole can be placed in the TLB 208 for location 0x000B. If a program, or process, attempts to access a memory segment here, it will fail immediately. Without this scheme, if location 0x000B is being used by another program, or process (and thus is backed), the erroneous process could overwrite 0x000B all the way to the next non-backed memory location which could be entire pages away, thus corrupting and impacting many other process' operation.

Utilizing a memory system with a large number of holes in the memory space as shown in the TLB 208 of FIG. 2, allows some inherent defense against malicious buffer overflows by making it less likely that a buffer overflow will bleed over into another program's memory. Additionally, one or more embodiments of the present invention take advantage of the ability of the virtual memory system (e.g., the memory manager 106) to know whether a page is backed or not in order to detect that a program has over stepped its boundary. Once a trigger indicating that a program has overstepped it boundary occurs, the memory manager 106 places the data being written into a honey pot, or overflow memory 114. A honey pot in general is what looks like something desirable to someone malicious but is really a trap to understand more about the attacker.

In accordance with one or more embodiments of the present invention, the honey pot, or overflow memory 114, is located in a pool of well-known and controlled memory areas within the system. Each section of memory in the memory pool can have an Instruction Execution Protection (IEP) bit set to prevent execution of any code, or computer instructions, stored in the section. Since what is being written into that location cannot be executed by the system it is safe to allow the location to be written to and the contents of the data can be examined. When the memory manager 106 detects that a buffer overflow has occurred it will go to the pool of memory areas and begin to allow the program to write to that memory (e.g., the overflow memory 114) while simultaneously beginning an intensive recording process using system and memory analyzer 116 to gather information about the program or data being written. As shown in FIG. 2, a code buffer overflow is detected in non-backed memory location 202c and the overflow detection triggers the memory manager 106 which directs the data to the memory sub-pool containing the overflow memory 114.

In accordance with one or more embodiments of the present invention, the system and memory analyzer 116 records state information about the program and/or data such as, but not limited to: an identifier of the program, or process, that has caused the buffer overflow; the data being written; network activity; code style; the Message-Digest algorithm 5 (MD5) hash of the data (e.g., computer code) being written; the addresses being accessed by the computer code being written; a loader associated with execution of the computer code being written; and/or other statistics about the content of memory such as size and addresses that the code requests access to. The collected data can be saved (e.g., written to memory) and then analyzed. The analysis can be performed manually be a person 206 such as a system administrator or security analysis and/or the analysis can be automated.

In accordance with one or more embodiments of the present invention, the information collected by the system and memory analyzer 116 (e.g., the state information) can be checked against well-known attack frameworks such as, but not limited to, Mitre Att&ck™ to determine whether the behavior and/or threat tools associated with the MD5 hashes, statistics, addresses, etc. are associated with known threat actors or patterns. A threat actor as known in the art refers to any entity that attempts to or successfully conducts malicious activities against an enterprise, whether intentional or unintentional. This information about whether the buffer overflow is associated with well know threat actors or patterns can be further used by a person 206 such as a system administrator or a security analyst to secure the machine and look for additional attack surfaces to secure the enterprise further. For example, a security policy of the processor can be updated based on the state information. Examples of security policies include but are not limited to: network signatures, logging trails, programs allowed to execute on the machine, data access, and identities being used.

In accordance with one or more embodiments of the present invention, given all of the forwarding of memory and the intensive recording of information, the system and memory analyzer 116 can be placed inside a separate piece of hardware to accelerate the response to such attacks. In addition, all or a portion of the memory manager 106 can also be located a separate piece of hardware.

Figure 3:
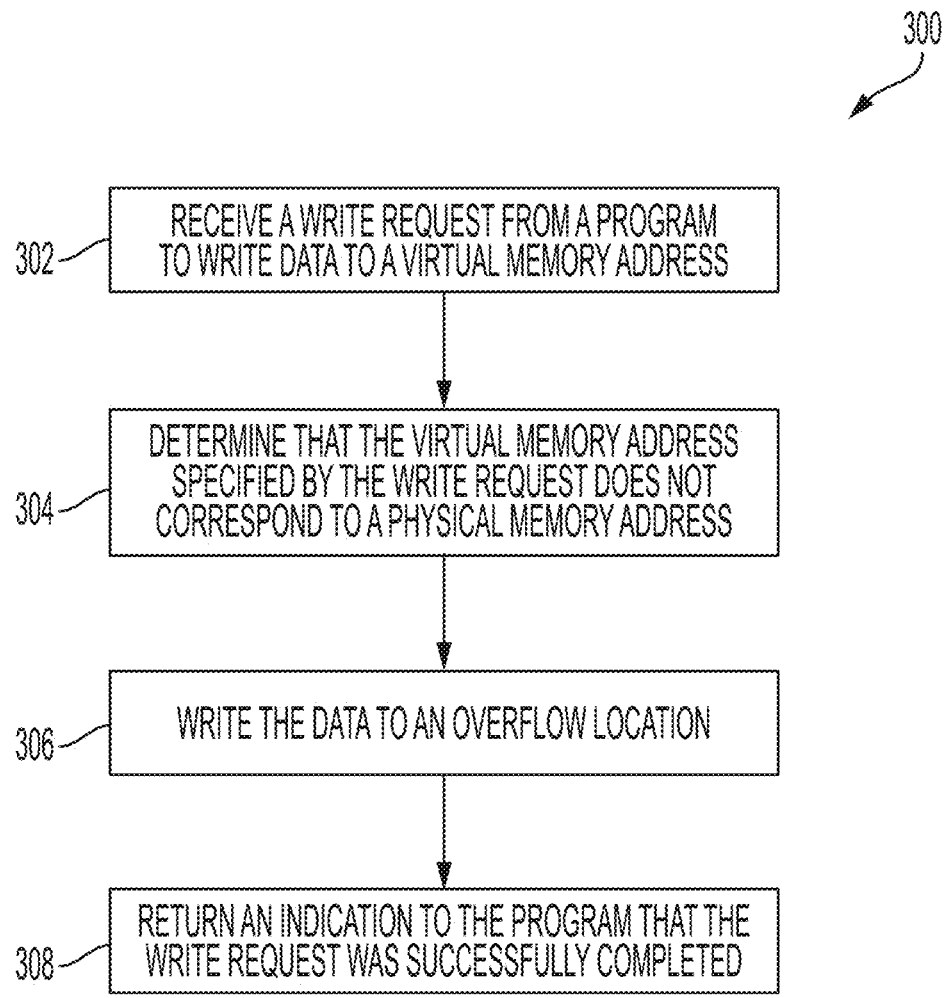
FIG. 3 depicts a flow diagram of a process for buffer overflow trapping according to one or more embodiments of the present invention.

Turning now to FIG. 3, a flow diagram of a process 300 for buffer overflow trapping is generally shown in accordance with one or more embodiments of the present invention. The processing shown in FIG. 3 may be executed by an operating system, such as OS 102 of FIG. 1, executing on a computer processor. The computer processor can be a stand-alone processor or a node in a cloud, such as node 10 in FIG. 4.

At block 302, a write request is received from a program. The write request includes a virtual memory address and data to be written to a memory. At block 304, it is determined that the virtual memory address is not assigned to a physical memory address and the virtual memory address is assigned to a physical memory address in an overflow memory. At block 306, the data is written to the physical memory address in the overflow memory. At block 308 an indication that the data write request was successfully completed is returned to the program. In accordance with one or more embodiments of the present invention, the program is not aware that the data was written to an overflow location. An indicator that that the data was successfully written to the memory is returned to the program and future requests by the program to access the virtual memory address are directed to the physical memory address in the overflow memory.

In accordance with one or more embodiments of the present invention, the recording of state information about one or both of the data and the program is initiated in response to determining that the virtual address is not assigned to a physical memory address. The state information can be utilized to identify a pattern associated with a malicious program or threat actor. In accordance with one or more embodiments of the present invention, a security policy of the processor is updated based at least in part on the state information.

In accordance with one or more embodiments of the present invention, the overflow location is configured to prevent the computer code from executing from the overflow location. In accordance with one or more embodiments of the present invention, a TLB is used to translate virtual memory addresses into physical memory addresses, and the TLB is configured using sparse memory placement.

One or more embodiments of the present invention are implemented based on a buffer overflow mode of the processor. A buffer overflow mode of the processor can be determined based for example on the setting of a flag or other indicator, and the writing of the data to an overflow memory location can be performed based on the buffer overflow mode of the processor being a first mode. Based on the buffer overflow mode being a second mode, blocks 304 and 306 can be skipped and instead an indication to the program that the write was not successfully completed is returned to the program. In addition, or alternatively, the buffer overflow mode can be associated with a particular program or group of programs. The buffer overflow mode of the processor is programmable and can be set automatically or by a person such as system administrator. In this manner, the writing to an overflow memory location and analysis in response to detecting a buffer overflow condition can be applied selectively during particular life cycle phases (e.g., during test), for programs running on particular processors, for particular program, for programs executing during selected time frames, etc.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
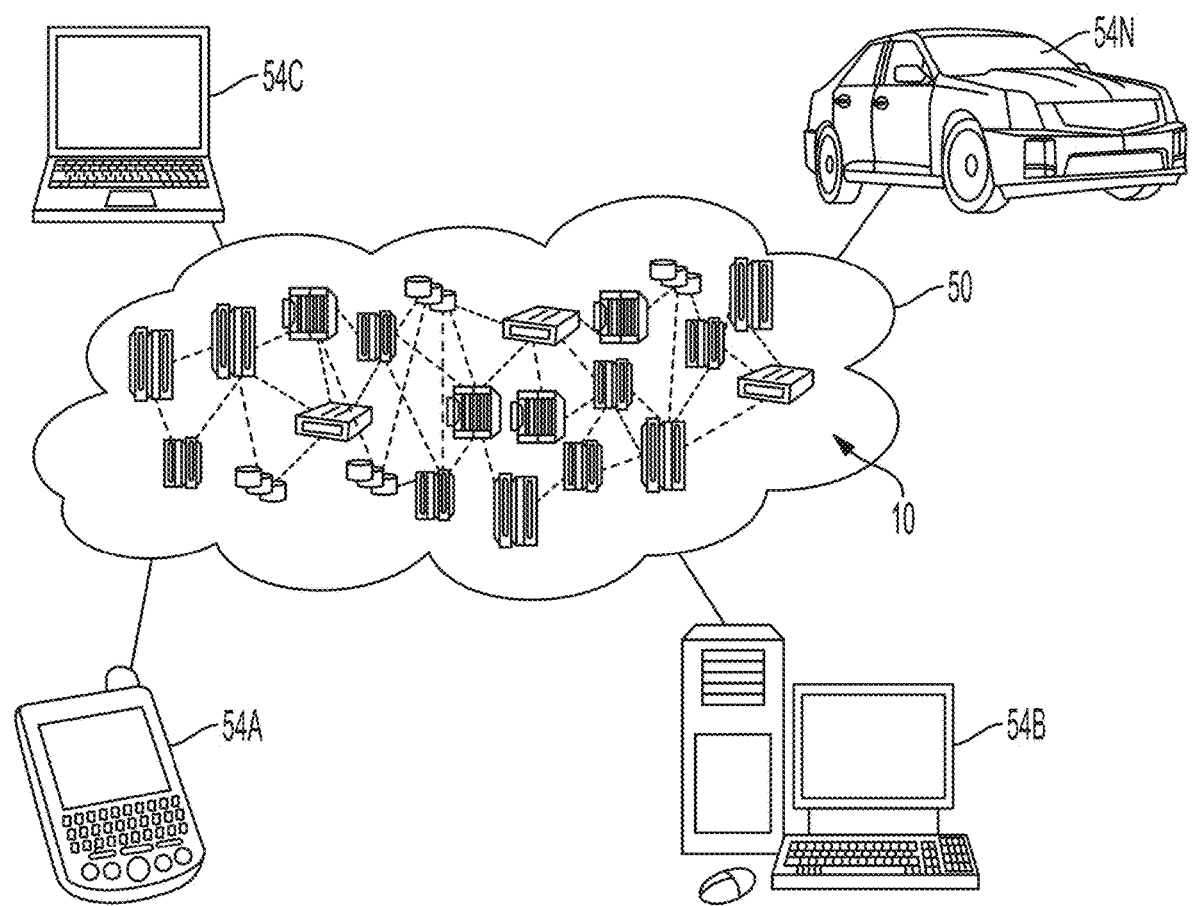
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
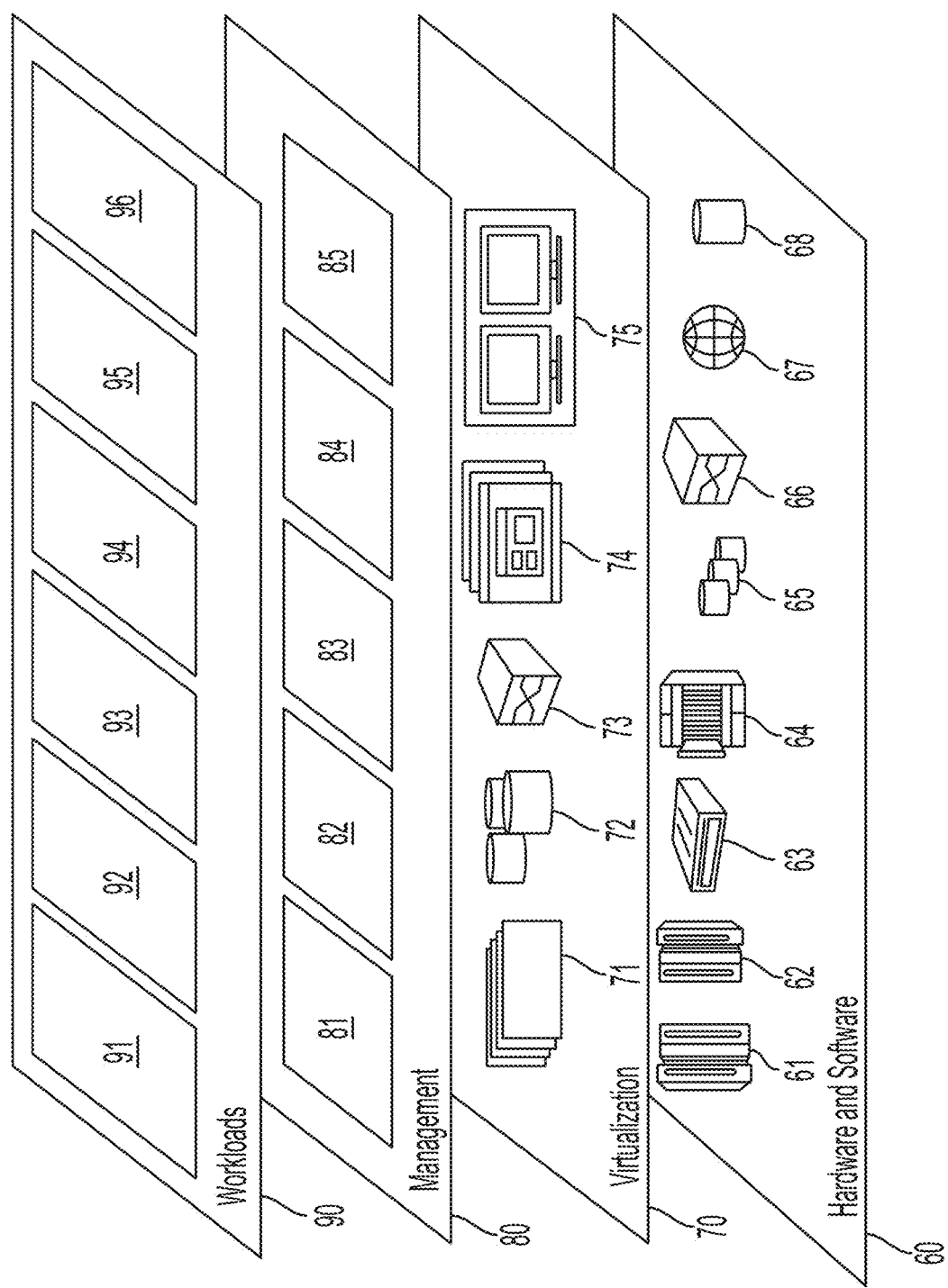
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and buffer overflow trapping 96.

It is understood that one or more embodiments of the present invention are capable of being implemented in conjunction with any type of computing environment now known or later developed.

Figure 6:
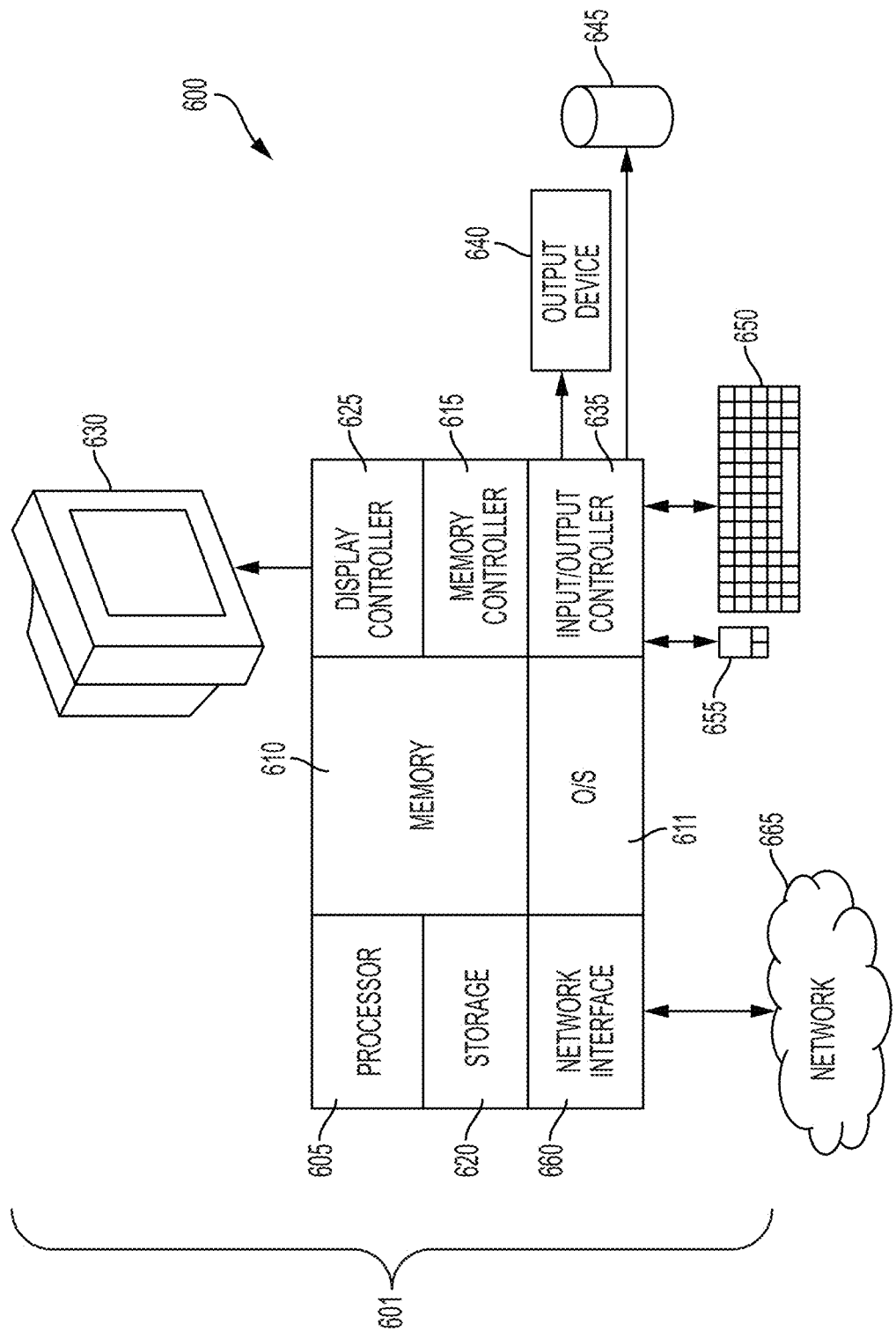
FIG. 6 illustrates a system for buffer overflow trapping according to one or more embodiments of the present invention.

Turning now to FIG. 6, a computer system for buffer overflow trapping is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   receiving, at an operating system executing on a processor, a write request from a program to write data to a memory, the write request comprising a virtual memory address and the data;
   determining that the virtual memory address is not assigned to a physical memory address;
   based on a determination that the virtual address is not assigned to a physical memory address, initiating recording of state information about the data and the program, wherein the state information includes an identifier of the program, addresses of memory being accessed by the program, and a loader associated with execution of the program;
based on the determining, assigning the virtual memory address to a physical memory address in an overflow memory;
writing the data to the physical memory address in the overflow memory; and
returning an indication to the program that the data was successfully written to the memory, wherein subsequent requests by the program to access the virtual memory address are directed to the physical memory address in the overflow memory.

2. The method of claim 1, wherein the state information is utilized to identify a pattern associated with a malicious program or threat actor.

3. The method of claim 1, wherein a security policy of the processor is updated based at least in part on the state information.

4. The method of claim 1, wherein the data includes computer code and the overflow location is configured to prevent the computer code from executing from the overflow location.

5. The method of claim 1, wherein a translation lookaside buffer (TLB) is used to translate virtual memory addresses into physical memory addresses, and the TLB is configured using sparse memory placement.

6. The method of claim 1, further comprising:
determining a buffer overflow mode of the processor, wherein the assigning, writing, and returning are performed based on the buffer overflow mode of the processor being a first mode; and
based on the buffer overflow mode being a second mode, returning an indication to the program that the write was not successfully completed in response to determining that the virtual address is not assigned to a physical memory address in the memory.

7. A system comprising:
one or more processors for executing computer readable instructions, the computer readable instructions controlling the one or more processors to perform operations comprising:
receiving, at an operating system executing on a processor of the one or more processors, a write request from a program to write data to a memory, the write request comprising a virtual memory address and the data;
determining that the virtual memory address is not assigned to a physical memory address;
based on a determination that the virtual address is not assigned to a physical memory address, initiating recording of state information about the data and the program, wherein the state information includes an identifier of the program, addresses of memory being accessed by the program, and a loader associated with execution of the program;
based on the determining, assigning the virtual memory address to a physical memory address in an overflow memory;
writing the data to the physical memory address in the overflow memory; and
returning an indication to the program that the data was successfully written to the memory, wherein subsequent requests by the program to access the virtual memory address are directed to the physical memory address in the overflow memory.

8. The system of claim 7, wherein the state information is utilized to identify a pattern associated with a malicious program or threat actor.

9. The system of claim 7, wherein a security policy of the processor is updated based at least in part on the state information.

10. The system of claim 7, wherein the data includes computer code and the overflow location is configured to prevent the computer code from executing from the overflow location.

11. The system of claim 7, wherein a translation lookaside buffer (TLB) is used to translate virtual memory addresses into physical memory addresses, and the TLB is configured using sparse memory placement.

12. The system of claim 7, wherein the operations further comprise:
determining a buffer overflow mode of the processor, wherein the assigning, writing, and returning are performed based on the buffer overflow mode of the processor being a first mode; and
based on the buffer overflow mode being a second mode, returning an indication to the program that the write was not successfully completed in response to determining that the virtual address is not assigned to a physical memory address in the memory.

13. A computer program product comprising a computer readable storage medium having program instructions embodied therewith, the program instructions executable by a processor to cause the processor to perform operations comprising:
receiving, at an operating system executing on the processor, a write request from a program to write data to a memory, the write request comprising a virtual memory address and the data;
determining that the virtual memory address is not assigned to a physical memory address;
based on a determination that the virtual address is not assigned to a physical memory address, initiating recording of state information about the data and the program, wherein the state information includes an identifier of the program, addresses of memory being accessed by the program, and a loader associated with execution of the program;
based on the determining, assigning the virtual memory address to a physical memory address in an overflow memory;
writing the data to the physical memory address in the overflow memory; and
returning an indication to the program that the data was successfully written to the memory, wherein subsequent requests by the program to access the virtual memory address are directed to the physical memory address in the overflow memory.

14. The computer program product of claim 13, wherein a security policy of the processor is updated based at least in part on the state information.

15. The computer program product of claim 13, wherein the data includes computer code and the overflow location is configured to prevent the computer code from executing from the overflow location.

16. The computer program product of claim 13, wherein a translation lookaside buffer (TLB) is used to translate virtual memory addresses into physical memory addresses, and the TLB is configured using sparse memory placement.

17. The computer program product of claim 13, wherein the operations further comprise:

determining a buffer overflow mode of the processor, wherein the assigning, writing, and returning are performed based on the buffer overflow mode of the processor being a first mode; and based on the buffer overflow mode being a second mode, returning an indication to the program that the write was not successfully completed in response to determining that the virtual address is not assigned to a physical memory address in the memory.

\* \* \* \* \*